(12) United States Patent
Himpe

(10) Patent No.: US 8,032,693 B2
(45) Date of Patent: Oct. 4, 2011

(54) SERIAL IN RANDOM OUT MEMORY

(75) Inventor: Vincent Himpe, San Jose, CA (US)

(73) Assignee: ST-Ericsson SA, Geneva (CH)

( * ) Notice: Subject to any disclaimer, the term of this patent is extended or adjusted under 35 U.S.C. 154(b) by 107 days.

(21) Appl. No.: 11/503,493

(22) Filed: Aug. 11, 2006

(65) Prior Publication Data

US 2007/0156975 A1   Jul. 5, 2007

(30) Foreign Application Priority Data

Dec. 30, 2005  (EP) .................................... 05078050

(51) Int. Cl.
*G06F 13/00*   (2006.01)

(52) U.S. Cl. ........ 711/104; 711/154; 711/200; 711/202; 711/206

(58) Field of Classification Search .................. 711/104, 711/154, 200, 202, 206
See application file for complete search history.

(56) References Cited

U.S. PATENT DOCUMENTS

| | | | |
|---|---|---|---|
| 4,827,473 A | 5/1989 | Tsuzuki et al. | |
| 6,253,288 B1 | 6/2001 | McAllister et al. | |
| 6,948,030 B1 | 9/2005 | Gupta et al. | |
| 7,170,780 B2 * | 1/2007 | Kawai | 365/185.03 |
| 7,464,229 B1 * | 12/2008 | Jones | 711/154 |
| 2006/0164907 A1 * | 7/2006 | Nguyen | 365/230.01 |

OTHER PUBLICATIONS

European Search Report from European Patent Application 05078050, filed Dec. 30, 2005.
Chang C-Y et al. "Evaluation of sequential-in-random-out memory device" Electronics Letters, IEE Stevenage, GB, vol. 31, No. 8, Apr. 13, 1995, pp. 620-621, XP006002712 ISSN: 0013-5194.
Communication pursuant to Article 94(3) EPC, for Application No. 05078050.1 dated Sep. 12, 2008.

* cited by examiner

*Primary Examiner* — Jasmine Song
(74) *Attorney, Agent, or Firm* — Lisa K. Jorgenson; James H. Morris; Wolf, Greenfield & Sacks, P.C.

(57) ABSTRACT

A serial in random out memory circuit has a number of memory cells integrated with write control circuitry for writing a sequence of data inputs to sequential locations in the memory cells. Read control circuitry is integrated to receive address signals from an external device and provide a random access read output from the memory cells, mapped into an address range of the external device. Compared to circuits using discrete components and conventional RAM chips, the integrated SIRO can enable some of the circuitry or external software to be dispensed with and so reduce costs or increase performance. The memory cells can be arranged in a number of blocks, selectable one at a time for mapping to the external device address range.

30 Claims, 2 Drawing Sheets

SERIAL IN RANDOM OUT MEMORY

BACKGROUND OF THE INVENTION

1. Field of the Invention

This invention relates to integrated circuit memory devices and to corresponding systems and methods of operating.

2. Discussion of the Related Art

Communication systems that have to process data streams require memories to hold incoming and outgoing data. Due to the irregular flow of data streams, e.g. packets of data arriving at irregular time intervals, this data is held often in temporary storage until the main processor is ready to retrieve it and process it. Known memory types include the following:

FIFO: (First in First out) Allows storing incoming data until needed, or ready to process. Its main drawback is that when the data is needed it still needs to be retrieved and stored in a second memory. Thus more memory is used then actually needed. Add to that the fact that copying data takes time as well DMA: (Direct Memory Access) here no temporary buffer is used but data is directly written into the processor's main memory. The main drawback is that during this operation the processor is idle. It cannot access its memory. Furthermore the DMA access is 'dangerous', If not closely controlled by software the risk exists that data is overwritten. Software also requires execution which takes time.

Dual Port Ram (DPR): This has no sequential input. This can be solved using additional logic but it requires components. Also the DPR is not fully used. Since both sides are read/write and only one side is used in READ mode and the other in WRITE mode half of its capability is not used. Furthermore there is no mechanism to hold off incoming data when the memory is full, Software will be required to handshake, which will again take execution time.

U.S. Pat. No. 4,827,473 shows a packet switching system having a receive packet storing circuit provided with a receive packet buffer of a first-in random out (FIRO) memory, and a transmit packet storing circuit provided with a transmit packet buffer of the FIRO memory. The FIRO memory has discrete components making up a FIRO controller (FIROC) and a conventional single port RAM. The FIROC has counters for generating write addresses for the RAM, and other RAM control signals, and interfaces to receive random read addresses from other devices, to read out packets stored in the RAM. The address space of the RAM, consists of 256 blocks of 4,096 bytes each. The FIROC is provided with a level 2 interface (L2INF), a microprocessor interface (µPINF), a bus interface (BINF), a data selector (DSEL) for the RAM, and an address selector (ASEL) for the RAM, an arbiter circuit (ARB) for contention among read out or write in signals from the L2INF, µPINF and BINF to the RAM.

There remains a need for improved devices.

SUMMARY OF THE INVENTION

An object of the invention is to provide improved integrated circuit memory devices and to corresponding systems and methods of operating. Another object of the present invention is to provide a memory, especially a random access memory (RAM).

According to a first aspect, the invention provides a circuit having a number of memory cells integrated with write control circuitry for writing a sequence of data inputs to locations in the memory cells, and integrated with read control circuitry arranged to receive address signals from an external device and thus to provide a random access read output from the memory cells. Since the circuit behaves as a random access memory (RAM) it can be directly mapped into an address range of the external device and used as such. The sequence of data inputs can be written sequentially or non-sequentially to the locations in the memory cells.

Compared to dual port RAM for example, embodiments of this integrated serial in, random out (SIRO) device can simplify the circuitry or the software, and thus reduce costs, or increase performance. Compared to circuits using discrete components and conventional RAM chips, the integrated SIRO can enable some of the circuitry or external software to be dispensed with and so reduce costs or increase performance. In essence the SIRO reduces the required amount of memory, e.g. cuts the required amount of memory in half. In a system with a FIFO of 1 Kbyte, a RAM of 1 Kbyte is needed to offload the FIFO. The present invention has the advantage that there is a substantial reduction in area at board or chip level as well as a cost reduction.

Mapping the memory directly to the address range of the external device can enable the external device or its software to be simplified.

An additional feature of some embodiments is the memory cells being arranged in a number of blocks, the read control circuitry being arranged to select one or more of the blocks at a time for mapping to the external device address range. This can enable larger memories for a given number of address lines. The memory cells can be arranged in blocks or sectors. The memory may be organized in pages of information. The memory then provides access to a page that can operate on that page.

Another such additional feature is the write control circuitry being arranged to write to each of the blocks in sequence, and to allow overwriting of previously written blocks depending on the external device. This can enable more flexibility in use.

Another such additional feature is the write control circuitry being arranged to monitor which blocks are available to be written, and output a signal indicating how full the memory is. This can help in managing the serial input and avoid loss of data through overflow.

Another such additional feature is the read control circuitry being arranged to alert the external device when there is new data to be read in the memory. This can reduce delays or save the overhead involved in having the external device polling the memory regularly for example.

An additional feature of some embodiments is the read control circuitry having a decoder to decode the received address according to the mapping to output a physical address to the memory cells.

An additional feature of some embodiments is the read control circuitry being arranged such that after a read operation, a next memory block in the sequence is selected for the mapping.

An additional feature of some embodiments is the write control circuitry being arranged to increment the write address after each write and once a block is filled, select a next block in the sequence. This is a convenient way of managing the writing.

Another such additional feature is the circuit being arranged to have variable block sizes. This helps make efficient use of the memory, particularly if the data has variable lengths, as is the case with variable length packets such as Ethernet packets.

The present invention also includes a system having the above circuit and an external device in the form of a processor arranged to read the memory cells.

Any of the additional features can be combined together and combined with any of the aspects. Other advantages will be apparent to those skilled in the art, especially over other prior art. Numerous variations and modifications can be made without departing from the claims of the present invention. Therefore, it should be clearly understood that the form of the present invention is illustrative only and is not intended to limit the scope of the present invention.

BRIEF DESCRIPTION OF THE DRAWINGS

How the present invention may be put into effect will now be described by way of example with reference to the appended drawings, in which.

DETAILED DESCRIPTION

Figure 1:
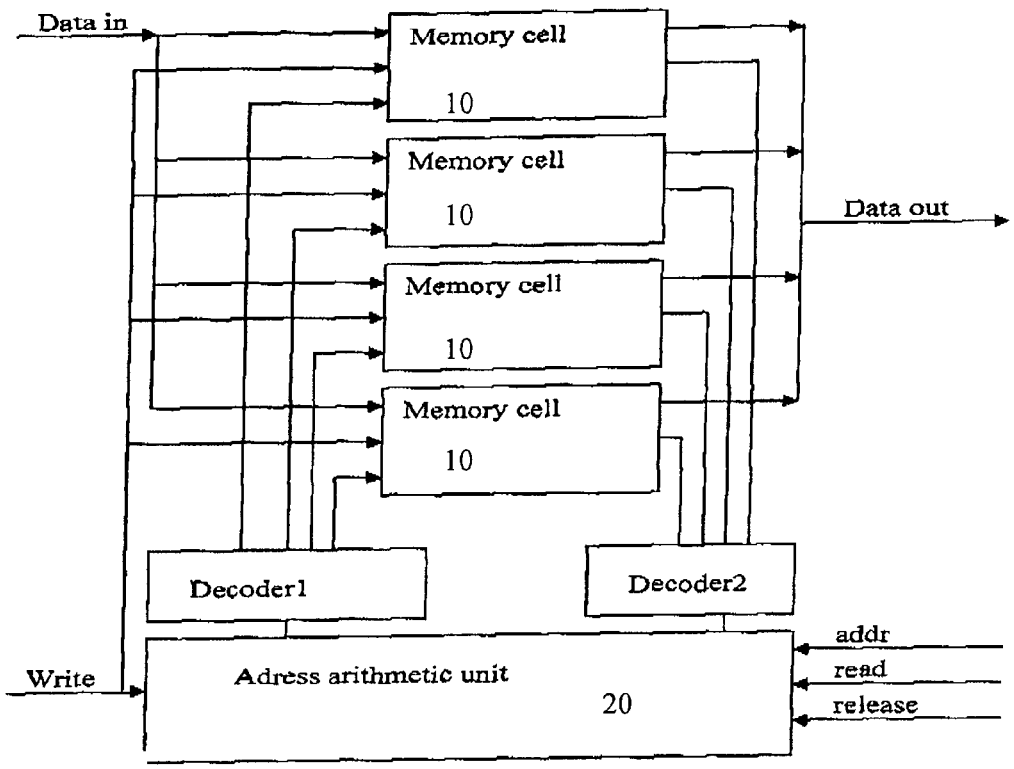
FIG. 1 shows a circuit according to a first embodiment of the present invention.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps. Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Operation of the SIRO memory according to a first embodiment of the invention will be described first with reference to FIG. 1. There are many possible other implementations. The main block of the SIRO memory is to be considered as a random access memory 10 with two data paths. One path is incoming, the other is outgoing. Write control circuitry and read control circuitry is implemented in the form of decoders 1 and 2 and a logic block called the Address Arithmetic unit (AAU) 20 for addressing of individual cells. This can be a hardwired logic block if maximum speed is required or some kind of processor running microcode for flexibility at the penalty of speed.

From the Sequential input point of view, whenever data arrives from the Sequential input channel and is stored in the RAM the AAU will calculate the next free and available location. It is possible, as with any other storage technology, that the storage is filled and over flows. Therefore the AAU also knows which data blocks have been 'freed' by the RO (random out) mode. In case no free memory exists anymore a hold-off signal is given to the SI side to signal that incoming traffic must stop. If so required this signal could be generated in advance to allow for data still in transit to safely arrive and be stored. So from the SI viewpoint this can be said to behave as FIFO memory or circular buffer. Except that the internal addressing logic is arranged to hold off overruns and keep track of used and available locations.

From the Random access point of view, the RO side has an address bus and a data bus. The processing side (which can be hardware or a processor) addresses the desired information using the address bus, and can retrieve it from the data bus. When the processing side has completed processing the chunk of memory, it gives a 'release' signal to the AAU. The MU will now calculate the position of the next chunk that was received, update the free locations toward the SI side and map the address lines of the processing side onto the correct location inside the memory block.

A practical example is as follows:

A post sorting machine reads addresses from letters and needs to feed this information to a processor. A mail address is specified as follows:

Name: 30 byte, Street+number 40 bytes, Postcode 4 bytes, and City 36 bytes.

This is a total of 100 bytes.

Information will arrive byte per byte (character per character) from the scanner and fed into the SIRO. To retrieve a person's address the control side reads the first 30 bytes. To read a post code it will read bytes 70 to 73. If this was to be done with a fifo, you would now already need to use temporary memory to store the intermediate bytes for later retrieval. Now some other routine in the machine's software indicates it needs to read the street and number. A simple pointer is passed and the routine can read bytes 30 to 69. No copying or passing by argument is required as the SIRO can be used as real ram mapped in the memory space of the processor. And the data bytes can be read in a different order to the order they were received.

After the current letter is processed, the control side gives the command 'Release' to the MU which changes the address mapping to make available the next packet mapped into the processor address space.

Now if the postcode is needed bytes 70 to 73 will be read. The MU will take into account that the next chunk of data is being read and will translate the virtual address into a real one.

An advantage of this is that no intermediate memory is needed as would be required when using a FIFO. Instead of passing data, pointers can be passed, the processor does not need to perform any calculation to know where the next data resides. This can increase processing speed and reduce at the same time the amount of memory (and chip area) required.

The MU (which can be implemented in various different ways), in this case contains an address generator using for example an adder. The present invention includes within its scope any suitable address generator and not necessarily an adder. Every time a release signal is given from the RO side the block or packet size is added to the current pointer and the resulting number is used as the 'base' to add to the virtual address. For example, the MU knows exactly how long any incoming packet is. This can be a fixed size, or random size depending upon the communication protocol. The source for this information can be either the RO side (for example: the system writes this information into a configuration register) or the Si side (for example a counter that counts the number of bytes in an incoming packet and attaches this information to the packet) or it can simply be embedded in the incoming information: example Ethernet packets store information in the data how long the packets are). For example, assume that packets are always 4 bytes long and every byte is 8 bits wide. The MU is aware of this. A number of packets arrive in the SIRO memory but no processing has been done so far. The RO side accesses this information. For example, if it needs to read the second byte, it will thus place the logical address '2' on the address bus and the SIRO will present the contents on its data bus for the attached system to retrieve. Next the attached system will read the $4^{th}$ byte by placing the logical address 4 on the address bus and reading the data from the data bus. These operations can go on as long as required and completely at random. Once the attached system has finished operations it signals the SIRO that it should retrieve the next chunk of memory. The MU will now mark the first 4 bytes as 'free'. In this example, the ADDER mechanism is used but the present invention includes other mechanisms, e.g. lookup tables for instance. The MU increments an internal register (lets call it the bytevector) with the packet length. Originally the contents of this register were 0 since the first packet was being processed. The contents now become 0+4=4. The system attached to the RO side will again perform operations. Just as before it will retrieve the $2^{nd}$ byte. So again it will present logical Address 2 to the address bus on the RO side. The MU will take this value and 'add' the contents of the bytevector register to it. Now the contents of the location pointed to will be presented on the data bus. In essence physical location 6 (address 2+bytevector 4) will be presented on the data bus. Accordingly, an 'offset' (the bytevector) has been added to the logical address present on the address bus of the RO side to create a 'physical' address inside the SIRO. When the data processing is done, a signal tells the SIRO to release as the operations are finished, thus incrementing the bytevector with 4, and so on. When the physical end of the memory is reached the adder will wrap around and start recounting at the beginning of the internal memory. In this whole system the relation between physical and logical address is handled by the SIRO memory without intervention of the attached systems.

A comparator keeps track of the addresses generated by the SI address counter and the RO AAU result. When they match, a 'holdoff' signal is given to the SI side indicating that the SIRO is full. This is similar behavior to a conventional FIFO. More logic could be added to give an early 'SIRO full warning' or to give an Empty marker or even show you how many packets are still to be processed.

Also logic can be added that stores the received packet size in the SIRO memory. This would allow for packets with different size to be processed. This can be useful in, for example, an Ethernet processor where packets can fluctuate in size. The only constraint is that to the RO side enough address lines must be available to cover the largest packet possible. Numerous other implementations are possible. The schematic views of the circuits are not intended to limit the scope.

Figure 2:
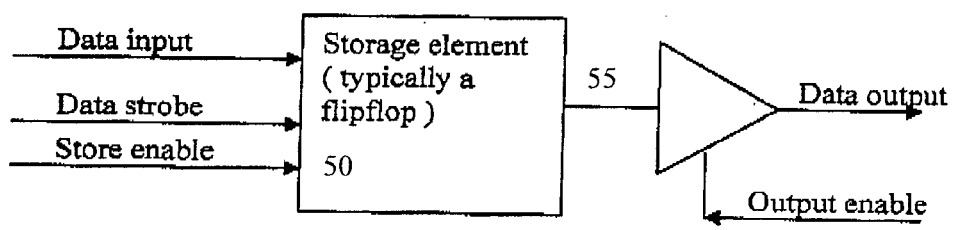
FIG. 2 shows a memory cell for the circuit of FIG. 1.

FIG. 2 shows a basic memory cell for use in the embodiment of FIG. 1 or in other embodiments. The cell can store a basic element of information (in this example a bit but this can be expanded to multi-bit cells if so required). Data present on the Data input line is stored into the storage element 50 when the Store enable is selected and the data strobe is selected (correct signal polarity needs to be respected of course). The content of the cell can be read by applying the Output enable signal which enables an output buffer 55. The contents of the cell are then available on the Data Output. This happens independently of the Data input/data strobe and Store enable, signal.

The memory array shown in FIG. 1 is an example with a 4 cell SIRO memory. The address decoders function to make sure that one and only one cell can be selected at any given time. Each cell is fed with a store enable signal, a write enable signal, and a data signal. This is to avoid bus contentions on the output side and double storage on the input side. The decoder 1 on the inside controls the Store enable signal of the memory cell. The write signal on the input goes to the Data store signal of the cells as well as into the AAU (address arithmetic unit). The AAU uses this signal to increment the address of the selected cell once a write operation is terminated. Incoming information is thus sequentially stored in the array.

On the other side the AAU receives an address, a read signal and a release signal. The system attached to the SIRO requests content to be read by applying an address and the READ signal. The AAU calculates the location of the information, and drives the decoder2 to output information from one cell onto the data out line. This calculation is required for the following reason: the 'window' of information that is available via the address bus is smaller then the size of the memory.

The calculation mechanism of which cell needs to be addressed is as follows. Since the window size is determined by the number of address lines (2 to the power of n, where n is the number of lines) we only need to deal with the base of where this window resides.

Figure 3:
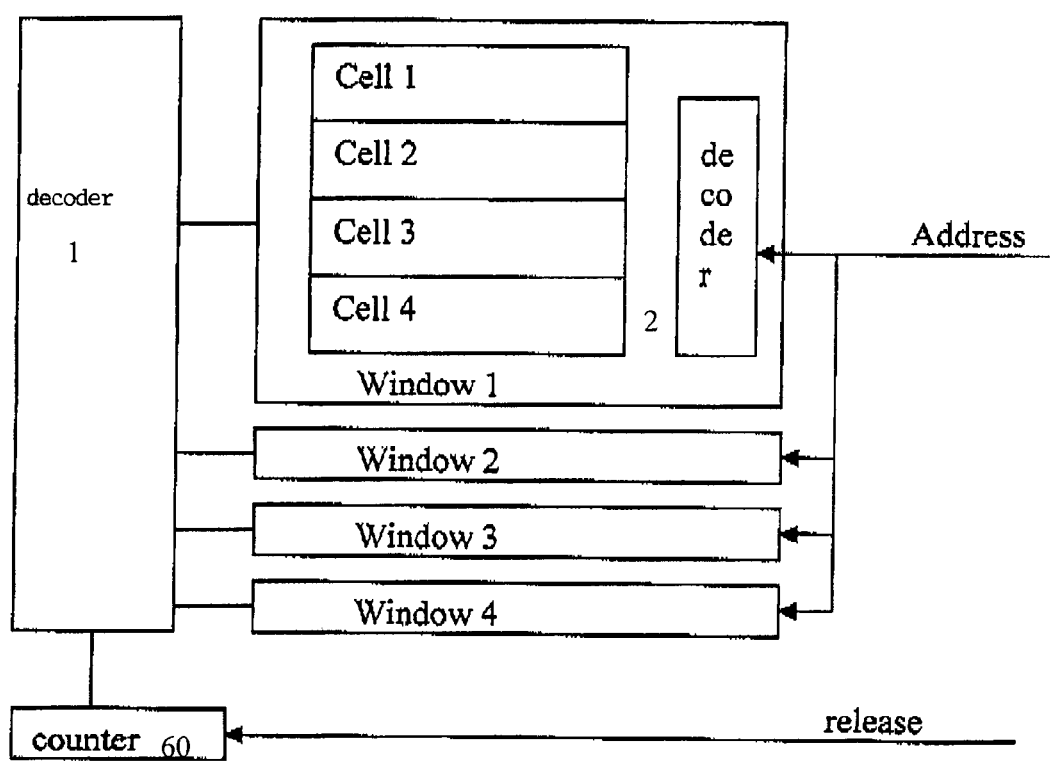
FIG. 3 shows a circuit according to another embodiment of the present invention.

FIG. 3 shows a schematic view of an example of how the memory cells can be arranged in 4 identical blocks, here called windows, each containing 4 bits of information, though there can be any number of bits. In a packet buffer, the block length might match the length of a packet. This SIRO has thus storage for 16 bits of information. The AAU includes a counter 60 which feeds decoder 1 which outputs signals to each block to select which block is being read or written. The address for read or write is fed to decoder2 which maps the input address to a physical address, and sends this to the memory cells of each block.

Arriving data will be stored in sequence. That means the first byte lands in Cell 1 of window 1 (CI WI), the next one arrives in Cell 2 of window I (C2W1). The sequence will continue with C3WI C4W1 C1W2 C2W2 C3W2 C4W2 C1W3 C2W3 C3W3 C4W3 C1W4 C2W4 C3W4 and C4W4 after which it rolls back to C1W1. The MU makes sure that no cells that are in use are overwritten.

The controlling system selects and can read any of the 4 cells in one particular window by controlling the address lines of the MU. In the example given, two address lines are needed. Once information is processed, the controlling system asserts the release signal and the MU increments the window selector. Now the next block of information is available and the controlling system can again read one of the four individual cells.

When the attached system no longer needs the information it can assert the Release signal. The MU then releases the storage cells so that they can take in more data from the input. It also increments the base of the window with a value (2 to the power of n).

The above schematic shows the principle which can be applied in various ways.

Additional elements can be added such as a signal telling that the memory is 'full' (to avoid overwriting data) and a signal 'not_empty'. The "not_empty" signal can be used to tell the attached system that there is new data present. This has been described above.

Applications of such SIRO memories include anywhere that incoming or outgoing data needs to be buffered before or after processing. Examples (not limited) are: Network processors, data acquisition systems, interprocessor communication systems, serial communication, ATM, packet buffers. Or they can be used to replace existing technologies such as FIFOs, LIFOs, circular buffers and more.

In summary, above has been described a novel type of memory that integrates logic to offload processing power requirements from the external processor, and reduces buffer size requirements in sequential data stream handling, while at the same time reducing the chip area required to handle a given amount of data.

The memory is capable, by itself, of receiving incoming sequential data, storing it and moderating the data flow from this receiving side. Towards the processing side it can give an easy fast and random access capability which can reduce the amount of hardware or software required to use, copy or temporarily store the information as is required in existing solutions. At the same time it offloads the controlling side of keeping track where physically certain information is stored.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A circuit having a number of memory cells integrated with serial in write control circuitry for determining a plurality of available locations in the memory cells and for writing a sequence of data inputs to the plurality of available locations in the memory cells, and integrated with random out read control circuitry arranged to receive a logical address from an external device and provide a random access read output from the memory cells, the read control circuitry being further arranged to map at least one first memory cell to the logical address, the logical address belonging to an address range of the external device, and depending on the external device, to free the at least one first memory cell and change a mapping of the logical address to map to at least one second memory cell different from the at least one first memory cell.

2. The circuit of claim 1, the memory cells being arranged in a number of blocks, the read control circuitry being arranged to select one or more of the blocks at a time for mapping to the external device address range.

3. The circuit of claim 2, the write control circuitry being arranged to write to each of the blocks in sequence, and to allow overwriting of previously written blocks depending on the external device.

4. The circuit of claim 2, the write control circuitry being arranged to monitor which blocks are available to be written, and output a signal indicating how full the memory is.

5. The circuit of claim 1, the read control circuitry being arranged to alert the external device when there is new data to be read in the memory.

6. The circuit of claim 1, the read control circuitry having a decoder to decode the received address according to the mapping to output a physical address to the memory cells.

7. The circuit of claim 2, the read control circuitry being arranged such that after a read operation, a next memory block in the sequence is selected for the mapping, the next block in the sequence comprising the at least one second memory cell.

8. The circuit of claim 2, the write control circuitry being arranged to increment the write address after each write and once a block is filled, select a next block in the sequence.

9. The circuit of claim 2, arranged to have variable block sizes.

10. A system having the circuit of claim 1, and an external device in the form of a processor arranged to read the memory cells.

11. A circuit comprising a plurality of memory cells and at least one serial in random out control circuit adapted to:

determine at least one first memory cell that is available for writing incoming data;
map a logical address to at least one second memory cell, the logical address belonging to an address range of an external device; and
in response to receiving a release signal:
free the at least one second memory cell; and
change a mapping of the logical address to map to at least one third memory cell, the at least one third memory cell being different from the at least one second memory cell.

12. The circuit of claim 11, wherein the at least one control circuit is integrated with the plurality of memory cells.

13. The circuit of claim 11, wherein the plurality of memory cells are arranged into a plurality of blocks, and wherein the at least one control circuit is further adapted to:

select at least one block comprising the at least one second memory cell; and
map logical addresses belonging to the address range of the external device to memory cells within the at least one block.

14. The circuit of claim 13, wherein the at least one block is at least one first block, and wherein the at least one control circuit is further adapted to:

select at least one second block that is different from the at least one first block, the at least one second block comprising the at least one third memory cell; and
in response to receiving the release signal:
free the memory cells within the at least one first block; and
change a mapping of the logical addresses belonging to the address range of the external device to map to memory cells within the at least one second block.

15. The circuit of claim 11, wherein the at least one control circuit is further adapted to, in response to receiving the release signal:

select at least one previously written memory cell; and
allow overwriting of the at least one previously written memory cell.

16. The circuit of claim 11, wherein the at least one control circuit is further adapted to output an indicator signal based on usage of the plurality of memory cells.

17. The circuit of claim 11, wherein the at least one control circuit is further adapted to send an alert signal indicating presence of new data in at least one of the plurality of memory cells.

18. The circuit of claim 11, wherein the at least one control circuit comprises a decoder for mapping the logical address to a first physical address corresponding to the at least one second memory cell and to a second physical address corresponding to the at least one third memory cell.

19. The circuit of claim 11, wherein the plurality of memory cells are arranged into a logical sequence, and wherein the at least one first memory cell is determined according to the logical sequence.

20. The circuit of claim 11, wherein the plurality of memory cells are arranged into a plurality of blocks comprising a first block and a second block, and wherein the first and second blocks are different in size.

21. A system comprising a plurality of memory cells, an external device, and at least one serial in random out control circuit adapted to:

determine at least one first memory cell that is available for writing incoming data;
map a logical address to at least one second memory cell, the logical address belonging to an address range of the external device;

free the at least one second memory cell; and change a mapping of the logical address to map to at least one third memory cell, the at least one third memory cell being different from the at least one second memory cell.

22. The system of claim 21, wherein the at least one control circuit is integrated with the plurality of memory cells.

23. The system of claim 21, wherein the plurality of memory cells are arranged into a plurality of blocks, and wherein the at least one control circuit is further adapted to:

select at least one block comprising the at least one second memory cell; and map logical addresses belonging to the address range of the external device to memory cells within the at least one block.

24. The system of claim 23, wherein the at least one block is at least one first block, and wherein the at least one control circuit is further adapted to:

select at least one second block that is different from the at least one first block, the at least one second block comprising the at least one third memory cell;

free the memory cells within the at least one first block; and change a mapping of the logical addresses belonging to the address range of the external device to map to memory cells within the at least one second block.

25. The system of claim 21, wherein the at least one control circuit is further adapted to:

receive a release signal from the external device;

select at least one previously written memory cell based on the release signal; and allow overwriting of the at least one previously written memory cell.

26. The system of claim 21, wherein the at least one control circuit is further adapted to output an indicator signal based on usage of the plurality of memory cells.

27. The system of claim 21, wherein the at least one control circuit is further adapted to send an alert signal to the external device indicating presence of new data in at least one of the plurality of memory cells.

28. The system of claim 21, wherein the at least one control circuit comprises a decoder for mapping the logical address to a first physical address corresponding to the at least one second memory cell and to a second physical address corresponding to the at least one third memory cell.

29. The system of claim 21, wherein the plurality of memory cells are arranged into a logical sequence, and wherein the at least one first memory cell is determined according to the logical sequence.

30. The system of claim 21, wherein the plurality of memory cells are arranged into a plurality of blocks comprising a first block and a second block, and wherein the first and second blocks are different in size.

* * * * *

UNITED STATES PATENT AND TRADEMARK OFFICE
CERTIFICATE OF CORRECTION

| | | |
|---|---|---|
| PATENT NO. | : 8,032,693 B2 | |
| APPLICATION NO. | : 11/503493 | |
| DATED | : October 4, 2011 | |
| INVENTOR(S) | : Vincent Himpe | |

It is certified that error appears in the above-identified patent and that said Letters Patent is hereby corrected as shown below:

Col. 4, line 29, should read:
    the command 'Release' to the AAU which changes the address line 33 should read as shown below
    The AAU will take into account that the next chunk of data is line 41 should read as shown below
    The AAU (which can be implemented in various line 48 should read as shown below
    address. For example, the AAU knows exactly how long any line 53 should read:
    or the SI side (for example a counter that counts the number of line 59 currently reads:
    The MU is aware of this. A number of packets arrive in the line 59 should read as shown below
    The AAU is aware of this. A number of packets arrive in the Col. 5, line 3, should read:
    chunk of memory. The AAU will now mark the first 4 bytes as line 6, should read:
    tables for instance. The AAU increments an internal register Col. 5, line 14, should read:
    The AAU will take this value and 'add' the contents of the Signed and Sealed this
Twenty-second Day of November, 2011

David J. Kappos
*Director of the United States Patent and Trademark Office*

CERTIFICATE OF CORRECTION (continued)

U.S. Pat. No. 8,032,693 B2

Col. 6, line 36, should read:
    after which it rolls back to C1W1. The AAU makes sure that no line 40, should read:
of the AAU. In the example given, two address lines are line 42, should read:
tem asserts the release signal and the AAU increments the line 47, should read:
it can assert the Release signal. The AAU then releases